(12) United States Patent
Asayama et al.

(10) Patent No.: US 8,439,094 B2
(45) Date of Patent: May 14, 2013

(54) PNEUMATIC TIRE WITH TREAD INCLUDING SIPES HAVING FIRST AND SECOND PROTRUSIONS

(75) Inventors: Yoshinori Asayama, Osaka (JP); Tetsuji Miyazaki, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 401 days.

(21) Appl. No.: 12/831,645

(22) Filed: Jul. 7, 2010

(65) Prior Publication Data
US 2011/0005654 A1    Jan. 13, 2011

(30) Foreign Application Priority Data
Jul. 9, 2009    (JP) ................................ 2009-162558

(51) Int. Cl.
*B60C 11/12* (2006.01)
(52) U.S. Cl.
USPC ............. 152/209.18; 152/209.21; 152/DIG. 3
(58) Field of Classification Search ............. 152/209.18, 152/209.21, DIG. 3
See application file for complete search history.

(56) References Cited

U.S. PATENT DOCUMENTS

| | | | | |
|---|---|---|---|---|
| 7,467,652 | B2 * | 12/2008 | Knispel et al. | ............ 152/209.21 |
| 2002/0139164 | A1 * | 10/2002 | Ishihara | .......................... 72/326 |

FOREIGN PATENT DOCUMENTS

| | | | |
|---|---|---|---|
| DE | 10020193 | * | 11/2001 |
| JP | H07-276923 | | 10/1995 |
| JP | 2000-211320 | * | 8/2000 |
| JP | 2004-161166 | | 6/2004 |
| NL | 2000322 | * | 5/2008 |

OTHER PUBLICATIONS

English machine translation of Rodewald, DE10020193, dated Nov. 2003.*
English machine translation of Takahashi, JP2000-211320, dated Aug. 2000.*

* cited by examiner

*Primary Examiner* — Richard Crispino
*Assistant Examiner* — Robert Dye
(74) *Attorney, Agent, or Firm* — Fish & Richardson P.C.

(57) ABSTRACT

The present invention provides a pneumatic tire that can exhibit high ice performance throughout a period of use of the tire, and can reduce a rejection rate without complicating production of the tire. The pneumatic tire includes: a plurality of land portions 4 partitioned by grooves 2 and 3 and formed in a tread surface 1*a*; and a sipe 5 formed in each of the land portions 4, wherein a plurality of first protrusions 7 are formed on only one of sipe inner wall surfaces 6 and 6 opposed to each other in the sipe 5, each of the first protrusions 7 continuing in a tire depth direction from the tread surface 1*a* to a sipe bottom 8 and protruding toward an opposite sipe inner wall surface, the first protrusion 7 is tapered toward the opposite sipe inner wall surface, a narrow portion 7*a* is provided between the tread surface 1*a* and the sipe bottom 8, and a second protrusion 9 protruding toward the opposite sipe inner wall surface is formed between narrow portions 7*a* of adjacent first protrusions.

5 Claims, 6 Drawing Sheets

PRIOR ART

PNEUMATIC TIRE WITH TREAD INCLUDING SIPES HAVING FIRST AND SECOND PROTRUSIONS

BACKGROUND OF THE INVENTION

1. Field of the Invention

The present invention relates to a pneumatic tire having a sipe cut into a land portion formed in a tread surface, and more particularly to a pneumatic tire useful as a studless tire.

2. Description of the Related Art

Generally, a studless tire has a sipe cut into a rib or a block as a land portion formed in a tread surface, and thus such configuration increases an edge effect of a sipe edge and a water removing effect of the sipe to increase ice performance (braking performance on an icy road).

However, in the pneumatic tire having a sipe, a load applied to the land portion may cause the sipe to be easily closed to prevent a sufficient water removing effect from being provided. With increasing wear of the land portion, the height of the land piece surrounded by the Sipes is reduced to increase rigidity. This may cause an insufficient inclination of the land piece and reduce the edge effect.

In order to prevent an insufficient increase in ice performance due to the abovementioned insufficient water removing effect, a method for reducing a sipe width (sipe thickness) and increasing the number of sipes to be formed in the land portion may be supposed. This allows the water removing effect to be covered by the edge effect to generally increase the ice performance.

Further, in order to increase an edge effect at the time of wearing of a land portion, a pneumatic tire is known in which a waveform sipe is formed, and the number of waves of the sipe is gradually increased toward a sipe groove bottom as disclosed in Japanese Patent Laid-Open No. 2004-161166. The above-described configuration can increase an edge effect at the time of wearing of a land portion to increase ice performance for problems.

As described above, the above-described solutions may be effectively combined to increase the ice performance of the pneumatic tire having a sipe throughout a period of use. Specifically, it may be effective that the waveform sipe is formed, the number of waves of the sipe is gradually increased toward the sipe groove bottom, and the sipe width (sipe thickness) is reduced to increase the number of sipes to be formed in the land portion.

However, in the tire having the above-described configuration, a sipe density is increased to reduce rigidity of each land piece. Also, a sipe blade for forming the sipe has waveforms on its opposite surfaces, which increases the surface area. Then, when a tire after vulcanization is released from a vulcanizing oven, vulcanization problems can rise such as insufficient release of the tire with a part of the land piece kept in tight contact with the sipe blade or generation of a surface crack. Rigidity of the sipe blade itself is also reduced, which results in reduction of a useable life of the sipe blade.

In order to increase a water removing effect, as disclosed in Japanese Patent Laid-Open No. 7-276923, a tire is also known in which a recess (wide sipe portion) is formed in a sipe inner wall surface, and water is introduced into the recess. However, in the tire described in Japanese Patent Laid-Open No. 7-276923, the forming of many recesses in a sipe inner wall surface may reduce rigidity of a land piece.

Thus, in view of the above-described problems, the present invention has an object to provide a pneumatic tire that can exhibit high ice performance throughout a period of use of the tire, and can prevent vulcanization problems such as insufficient release of the tire or a surface crack.

SUMMARY OF THE INVENTION

In order to solve the above-described problems, the present invention provides a pneumatic tire comprising: a plurality of land portions partitioned by grooves and formed in a tread surface; and sipes formed in each of the land portions, wherein a plurality of first protrusions are formed on only one of sipe inner wall surfaces opposed to each other in the sipe, each of the first protrusions continuing in a tire depth direction from the tread surface to a sipe bottom and protruding toward an opposite sipe inner wall surface, the first protrusion is tapered toward the opposite sipe inner wall surface, a narrow portion is provided between the tread surface and the sipe bottom, and a second protrusion protruding toward the opposite sipe inner wall surface is formed between narrow portions of adjacent first protrusions.

With the above-described configuration, the first protrusion is formed on only one of the sipe inner wall surfaces opposed to each other, and thus there is no risk that a load applied to the land portion causes the sipe to be closed. Further, the first protrusion is tapered toward the opposite sipe inner wall surface, thereby ensuring a sufficient space in the sipe. This can exhibit a sufficient water removing effect.

Also, the first protrusion is formed to continue in the tire depth direction from the tread surface to the sipe bottom and thus has sufficient rigidity. Thus, there is no risk for the first protrusion exposed on the tread surface to be worn unevenly, and with the first protrusion being tapered toward the opposite sipe inner wall surface, a high edge effect can be exhibited.

As described above, in the present invention, the water removing effect and the edge effect can be sufficiently exhibited to increase ice performance. Thus, there is no need to reduce a sipe width to increase the number of sipes. Further, a sipe blade used in production of the pneumatic tire according to the present invention has one surface formed with irregularities and the other surface kept flat. This allows the tire to be smoothly released from a vulcanizing oven and prevents vulcanization problems.

Further, in the present invention, the narrow portion is provided in the first protrusion, and the second protrusion is formed between the narrow portions of the adjacent first protrusions. The position of the narrow portion formed in the first protrusion may be arbitrarily set such as on a tread surface side, a sipe bottom side, or both the tread surface side and the sipe bottom side.

As such, the narrow portion and the second protrusion are formed in appropriate positions in the sipe depth direction, thereby allowing the second protrusion to be exposed on the tread surface at arbitrary timing to reinforce the ice performance. This can exhibit the edge effect and the water removing effect with a good balance throughout a period of use of the tire, and maintain high ice performance.

Like the first protrusion, the second protrusion is preferably tapered toward the opposite sipe inner wall surface, and this can ensure a sufficient capacity in the sipe. Protruding lengths of the first protrusion and the second protrusion are preferably the same. Further, a plurality of second protrusions may be formed between adjacent narrow portions, and lengths of the second protrusions in the sipe depth direction may be different.

The first protrusion and the second protrusion may be specifically configured so that the first protrusion is formed to be gradually narrower from the tread surface side toward the sipe bottom side, the sipe bottom side of the first protrusion is the narrow portion, and the second protrusion is formed on the sipe bottom side. In the above-described configuration, the second protrusion is exposed on the tread surface in a late stage of wearing, thereby increasing the edge effect and prevent a reduction in the ice performance.

The first protrusion and the second protrusion may be configured so that the first protrusion is formed to be gradually narrower from the sipe bottom side toward the tread surface side, the tread surface side of the first protrusion is the narrow portion, and the second protrusion is formed on the tread surface side. In the above-described configuration, the second protrusion is exposed on the tread surface from the beginning, and thus the edge effect can further increase the ice performance in an early stage of wearing.

The position of the second protrusion to be formed on the sipe inner wall surface may be set according to a sipe forming position in the land portion. Specifically, a land piece at an end of the land portion tends to have lower rigidity than a land piece at a center of the land portion.

Thus, in such a case, the first protrusion and the second protrusion may be configured so that in a sipe at an edge of the land portion among sipes provided in the land portion, the first protrusion is formed to be gradually narrower from the sipe bottom side toward the tread surface side, the tread surface side of the first protrusion is the narrow portion, and the second protrusion is formed on the tread surface side, and in a sipe at a center of the land portion, the first protrusion is formed to be gradually narrower from the tread surface side toward the sipe bottom side, the sipe bottom side of the first protrusion is the narrow portion, and the second protrusion is formed on the sipe bottom side.

This can increase the edge effect at the edge of the land portion and the water removing effect at the center of the land portion, thereby generally exhibiting the ice performance with a good balance.

The tire having the above-described configuration can be advantageously easily molded using only one type of sipe blade. Specifically, a sipe blade provided to stand on an inner peripheral surface of a tire forming mold can be simply vertically reversed to easily set whether the second protrusion is formed on the tread surface side or the sipe bottom side.

A plurality of sipes extending in a tire width direction in the land portion are generally formed at intervals in a tire circumferential direction. At this time, the sipe inner wall surface on which the first protrusion and the second protrusion are formed may be arranged on one of the sipe inner wall surfaces opposed to each other. In this case, forming the first protrusion and the second protrusion on a sipe inner wall surface facing in a tire rotating direction (sipe inner wall surface facing the side opposite to a vehicle traveling direction in grounding of the land portion) can increase traction performance on an icy road.

Alternatively, forming the first protrusion and the second protrusion on a sipe inner wall surface facing the side opposite to the tire rotating direction (sipe inner wall surface facing in the vehicle traveling direction in grounding of the land portion) can increase braking performance on an icy road.

Further, the first protrusion and the second protrusion may be formed on sipe inner wall surfaces in different directions in the same land portion. Specifically, assuming that the land portion is divided into a front side and a rear side with respect to the tire rotating direction, a drive force in tire driving is first transmitted to a road by land pieces on the front side of the land portion, and thus the land pieces in this region have a large influence. On the other hand, a braking force in tire braking is mainly applied to land pieces on the rear side of the land portion, and thus the land pieces in this region have a large influence.

Thus, the present invention adopts a configuration in which the sipe inner wall surface on which the first protrusion and the second protrusion are formed in the sipe is a surface closer to the center of the land portion in a tire circumferential direction among the sipe inner wall surfaces opposed to each other. This can increase both the traction performance and the braking performance on an icy road with a good balance. Also, a symmetrical pattern is formed with respect to the center of the land portion in the tire circumferential direction, thereby eliminating limitations in a tire mounting direction.

In the present invention, the plurality of first protrusions are formed on only one of the sipe inner wall surfaces, each of the first protrusions continuing in the tire depth direction from the tread surface to the sipe bottom and protruding toward the opposite sipe inner wall surface, the first protrusion is tapered toward the opposite sipe inner wall surface, the narrow portion is provided between the tread surface and the sipe bottom, and the second protrusion protruding toward the opposite sipe inner wall surface is formed between the narrow portions of the adjacent first protrusions. This can prevent vulcanization problems and exhibit high ice performance.

DETAILED DESCRIPTION OF THE PREFERRED EMBODIMENTS

First Embodiment

Figure 1:
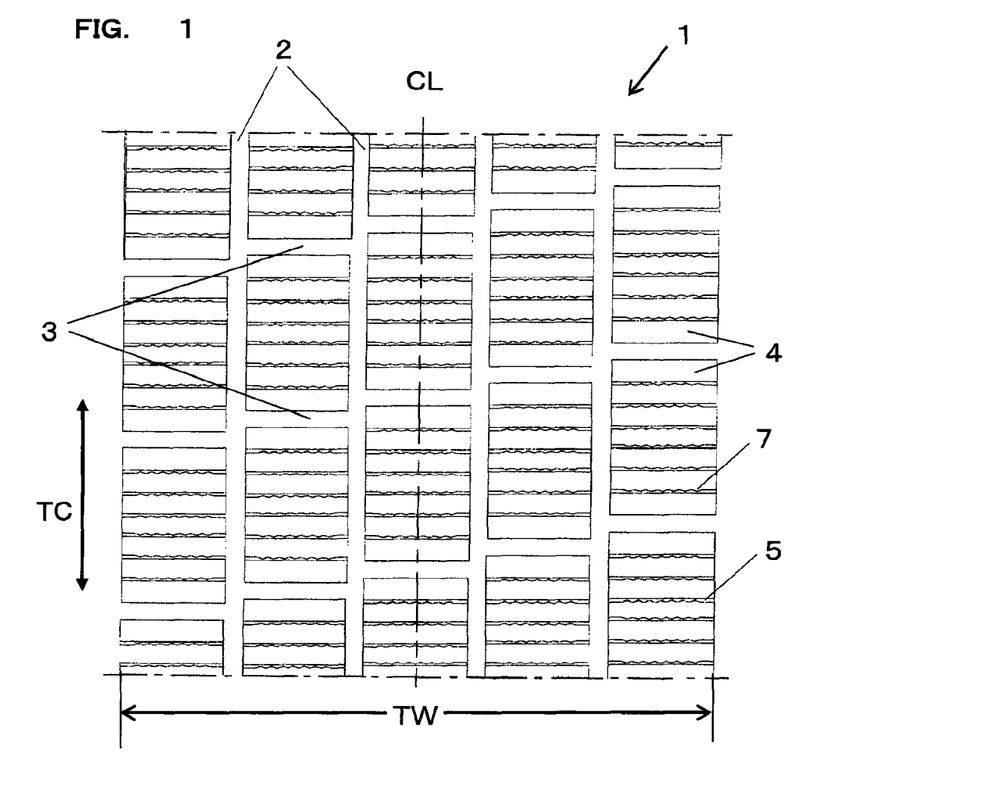
FIG. 1 is a plan view showing a tread pattern of a pneumatic tire according to a first embodiment of the present invention.
Figure 2:
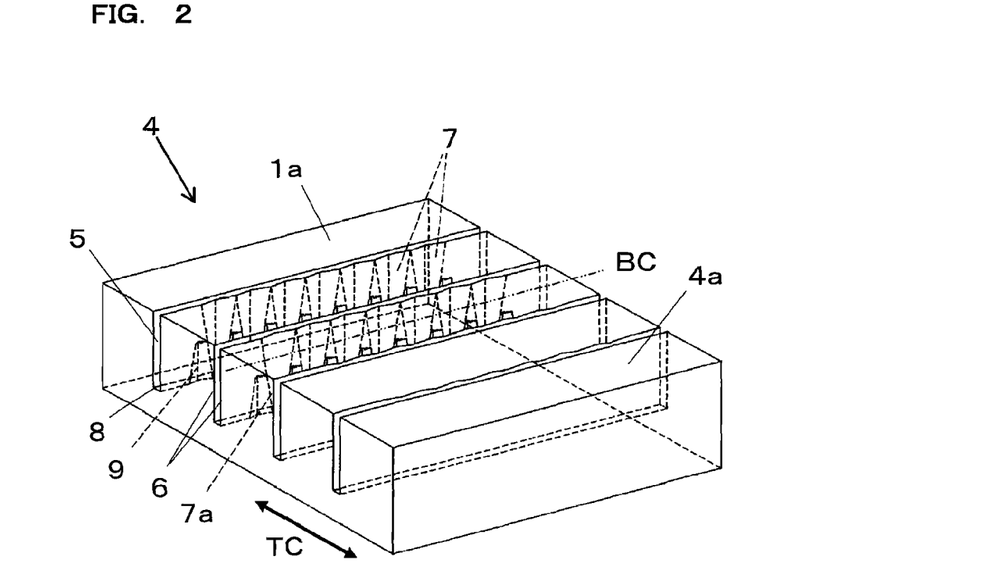
FIG. 2 is a perspective view showing a block in FIG. 1.

FIGS. 1 and 2 show a pneumatic tire according to a first embodiment of the present invention. FIG. 1 is a plan view showing a tread pattern of a tread section of a pneumatic tire, and FIG. 2 is a perspective view showing a block of the pneumatic tire. The pneumatic tire is a radial tire, and in a surface 1a of a tread section 1, a plurality of blocks 4 are formed by a plurality of main grooves 2 formed in a tire circumferential direction TC and a plurality of lateral grooves 3 formed to connect the main grooves 2. In this embodiment, a land portion is entirely constituted by a block, but not limited to this, the land portion may be constituted by a rib and a block.

As shown in FIG. 1, a plurality of sipes 5 linearly extending in a tire width direction TW are formed in each block 4. The block 4 is partitioned by the sipes 5 into a plurality of block pieces (land pieces) 4a. The sipes 5 may be formed extending in the tire width direction TW, or may be formed extending along or diagonally to a tire equator line CL.

Sipe inner wall surfaces 6 and 6 of each sipe 5 are opposed to each other with a certain space therebetween, and formed perpendicularly to the tread surface 1a. A first protrusion 7 and a second protrusion 9 are formed on only one of the sipe inner wall surfaces 6 and 6 opposed to each other. The first protrusion 7 is formed to be gradually narrower from a side of the tread surface 1a toward a side of a sipe bottom 8, and the sipe bottom side of the first protrusion 7 is a narrow portion 7a. A second protrusion 9 is formed between adjacent narrow portions 7a.

The first protrusion 7 and the second protrusion 9 are tapered so as to protrude toward the opposite sipe inner wall surface 6. Specifically, both the first protrusion 7 and the second protrusion 9 have a substantially triangular section such that a height from a base of the triangle (protruding length to a top) is constant and a length of the base (protrusion width) changes. The first protrusion 7 and the second protrusion 9 each is formed so that its centerline is perpendicular to the tread surface 1a.

As described above, the first protrusion 7 is formed to be gradually narrower from the side of the tread surface 1a toward the side of the sipe bottom 8, and the second protrusion 9 is formed to be gradually narrower from the side of the sipe bottom 8 toward the side of the tread surface 1a. A height of the second protrusion 9 is about half of the entire sipe depth, and an upper portion of the second protrusion 9 is used as a space for storing removed water. A plurality of first protrusions 7 are formed on the tread surface 1a so as to be in contact with each other.

With the above-described configuration, in the pneumatic tire according to this embodiment, the first protrusion 7 prevents the sipe 5 from being closed even if a load is applied to the block 4. Also, the first protrusion 7 is tapered, thereby exhibiting an edge effect and also ensuring a space required for exhibiting a water removing effect in the sipe 5. This can exhibit high ice performance. Further, the second protrusion 9 is exposed on the tread surface around when rigidity of the block piece 4a comes to be increased by wear, thereby reinforcing the edge effect and preventing a reduction in the ice performance. This can exhibit high ice performance throughout a period of use of the tire.

In this embodiment, the sipe inner wall surface 6 on which the first protrusion 7 and the second protrusion 9 are formed is a surface closer to a block center BC (center of the land portion) in the tire circumferential direction TC. This can increase both traction performance and braking performance on an icy road with a good balance.

Figure 3:
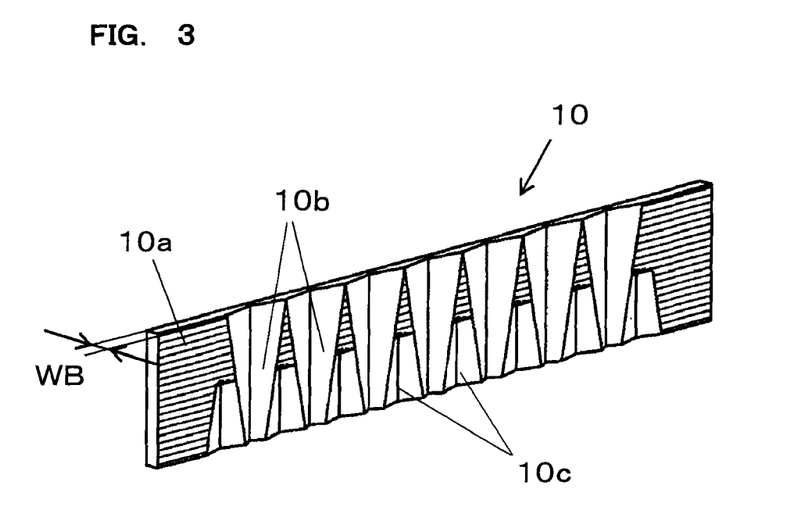
FIG. 3 is a perspective view of a sipe blade for forming a sipe in FIG. 1.

FIG. 3 is a perspective view of a sipe blade used for forming the sipe in this embodiment. A sipe blade 10 is provided to stand with its top surface in contact with an inner peripheral surface of a split mold (vulcanizing oven). In FIG. 3, the shaded areas show a blade surface. The sipe blade 10 includes a blade body 10a, a first recess 10b for forming the first protrusion 7 on the sipe inner wall surface, and a second recess 10c for forming the second protrusion 9. The shape of the sipe blade 10 in FIG. 3 is the exact shape of the sipe 5.

As shown in FIGS. 1, 2, and 3, the sipe blade used in this embodiment has one surface formed with irregularities and the other surface kept flat. This allows the sipe blade to be smoothly drawn out of the tire when the tire is released from the vulcanizing oven after tire molding. This can prevent defects such as a surface crack. Also, rigidity of the sipe blade is not reduced, and thus there is no occurrence that a useable life of the sipe blade is reduced.

Second Embodiment

Figure 4:
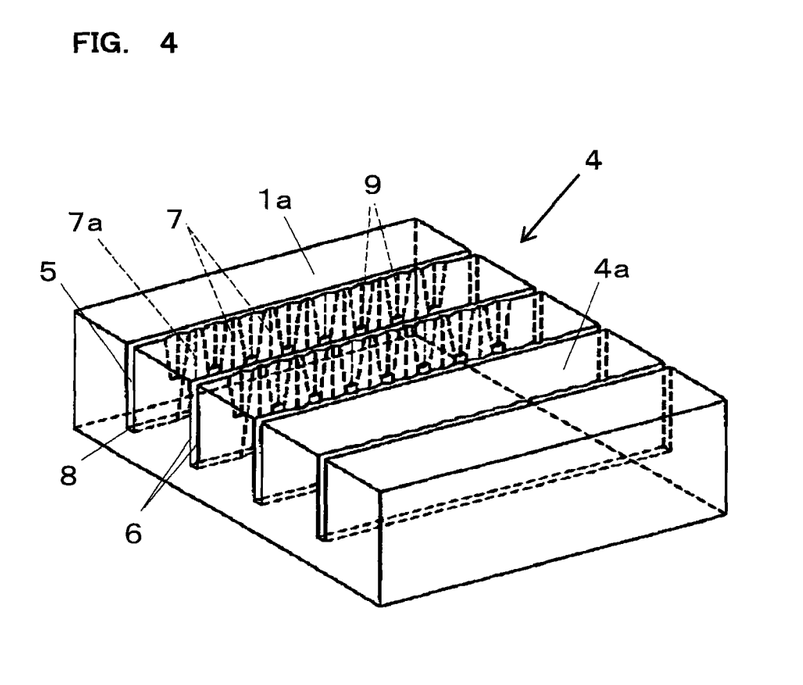
FIG. 4 is a perspective view showing a block according to a second embodiment of the present invention.

FIG. 4 is a perspective view showing a block of a pneumatic tire according to a second embodiment. This embodiment has a feature in that a first protrusion 7 is formed to be gradually narrower from a side of a sipe bottom 8 toward a side of a tread surface 1a, the side of the tread surface 1a of the first protrusion 7 is a narrow portion 7a, and a second protrusion 9 is formed between adjacent narrow portions 7a. A tread pattern of a tread section and other configurations are the same as in the first embodiment.

In this embodiment, the first protrusion 7 and the second protrusion 9 are formed in a direction opposite to that in the first embodiment. The above-described configuration is particularly useful for relatively soft tread rubber. Specifically, the second protrusion is exposed on the tread surface from the beginning, thereby increasing an edge effect in an early stage of wearing and increasing ice performance. In the above-described configuration, the second protrusion 9 disappears in a late stage of wearing, thereby ensuring a sufficient capacity in a sipe and increasing a water removing effect to maintain the ice performance. Further, rigidity of a block piece 4a is gradually increased with increasing wear of the tire, and thus only the first protrusion 7 can sufficiently maintain the ice performance.

A sipe blade used for forming the sipe in this embodiment may be the same as that used in the first embodiment. Specifically, the sipe blade shown in FIG. 3 may be provided to stand with its bottom surface in contact with an inner peripheral surface of a split mold.

Third Embodiment

Figure 5:
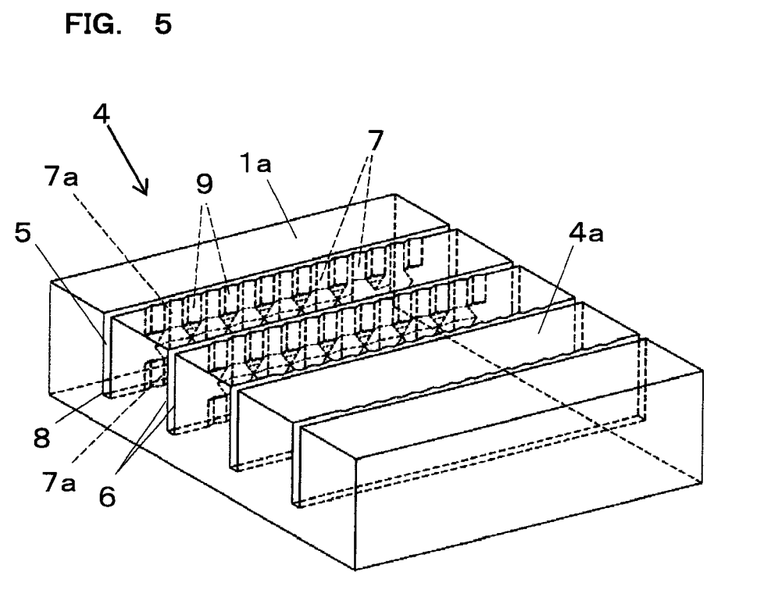
FIG. 5 is a perspective view showing a block according to a third embodiment of the present invention.

FIG. 5 is a perspective view showing a block of a pneumatic tire according to a third embodiment. This embodiment has a feature in that a first protrusion 7 is formed to be gradually narrower from around a center in a sipe depth direction vertically toward a side of a tread surface 1a and a side of a sipe bottom 8, both the side of the tread surface 1a and the side of the sipe bottom 8 of the first protrusion 7 are narrow portions 7a, and a second protrusion 9 is formed between adjacent narrow portions 7a. A tread pattern of a tread section and other configurations are the same as in the first embodiment.

Specifically, in this embodiment, the narrow portions 7a are provided in upper and lower regions of about one third of the entire length of the first protrusion 7 in the sipe depth direction, and the second protrusion 9 is provided in each of the regions. In this embodiment, the first protrusion 7 is formed to have the narrow portion 7a of a constant width and to be gradually narrower from the center in the sipe depth direction to the narrow portion 7a. The above-described configuration can ensure a sufficient space for exhibiting a water removing effect in the center of the sipe, and also reinforce an edge effect in early and late stages of wearing to generally increase ice performance.

Figure 6:
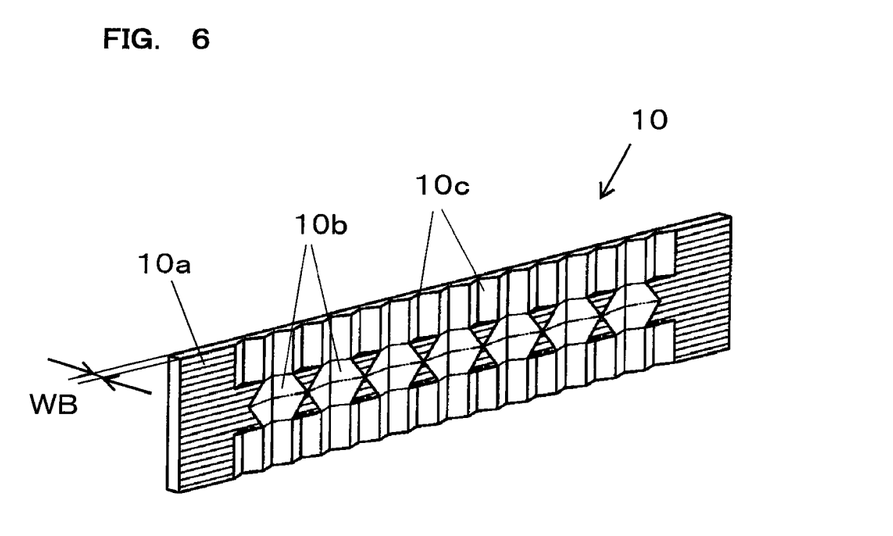
FIG. 6 is a perspective view showing a sipe blade for forming a sipe in FIG. 5.

FIG. 6 is a perspective view of a sipe blade used for forming the sipe in this embodiment. The sipe blade 10 includes a blade body 10a, a first recess 10b for forming the first protrusion 7 on a sipe inner wall surface, and a second recess 10c for forming the second protrusion 9. The second recess 10c is formed in each of a top surface side and a bottom surface side of the sipe blade.

Figure 7:
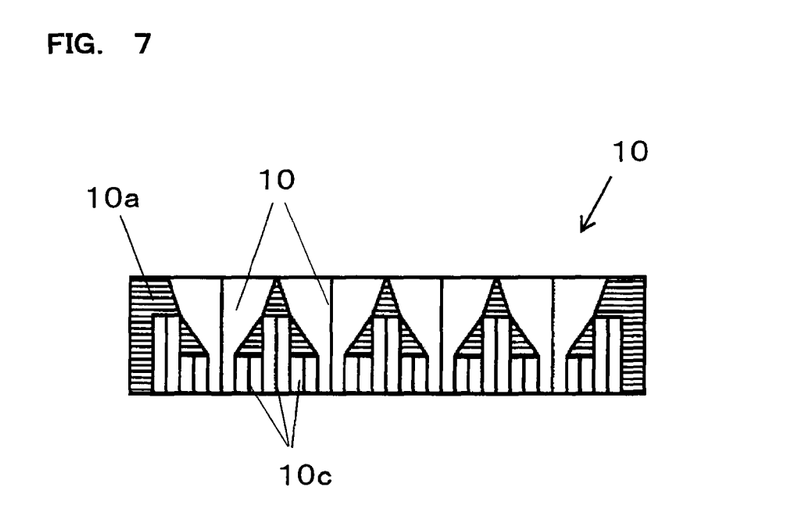
FIG. 7 is a front view showing a sipe blade for forming a sipe of a different form.

The sipe 5 is not limited to the above-described form. For example, FIG. 7 shows a sipe blade for forming a sipe of a different form. In order to form three second protrusions between adjacent first protrusions, the sipe blade of this form includes a blade body 10a, a first recess 10b, and three second recesses 10c formed between adjacent first recesses 10b.

In order to form one middle protrusion to be longer than two protrusions at opposite ends among the three second protrusions, a middle second recess 10c is formed to be longer than the other recesses among the corresponding second recesses 10c. This increases the number of second protrusions exposed according to the degree of wear of the block 4 to increase the edge effect and maintain high ice performance.

Fourth Embodiment

Figure 8:
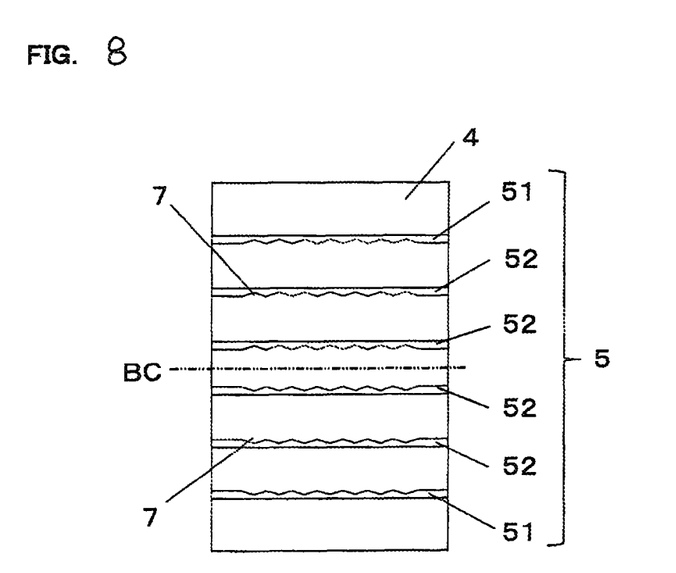
FIG. 8 is a plan view showing a block according to a fourth embodiment of the present invention.

FIG. 8 is a plan view showing a block of a pneumatic tire according to a fourth embodiment. This embodiment has a feature in that a first protrusion 7 uses two types of sipes shown in FIGS. 2 and 4. A tread pattern of a tread section and other configurations are the same as in the first embodiment.

Specifically, in this embodiment, as shown in FIG. 8, in a sipe 5 provided in a block 4, a sipe 51 at an edge of the block 4 is formed so that a first protrusion 7 is gradually narrower from a side of a sipe bottom 8 toward a side of a tread surface 1a, the side of the tread surface 1a of the first protrusion 7 is a narrow portion 7a, and a second protrusion 9 is formed on the side of the tread surface 1a. Meanwhile, a sipe 52 at a center of the block 4 is formed so that a first protrusion 7 is gradually narrower from the side of the tread surface toward the side of the sipe bottom 8, the side of the sipe bottom 8 of the first protrusion 7 is a narrow portion 7a, and a second protrusion 9 is formed on the side of the sipe bottom 8.

The above-described configuration can increase an edge effect in a block piece 4a at the edge of the block 4 that tends to have lower rigidity than a block piece 4a at the center of the block 4, and increase a water removing effect at the center of the block 4, thereby exhibiting ice performance of the entire land portion with a good balance.

Example

Now, the present invention will be described in more detail with examples, but the present invention is not limited to the examples as long as it is within the gist of the invention.
[Production of Tire]

As shown in Table 1, pneumatic radial tires shown in the first to fourth embodiments were actually produced, and performances thereof were evaluated. Specifically, in a tread pattern shown in FIG. 1, a tire having a sipe 5 shown in FIG. 2 was Example 1, a tire having a sipe 5 shown in FIG. 4 was Example 2, a tire having a sipe 5 shown in FIG. 5 was Example 3, and a tire having a sipe 5 shown in FIG. 8 was Example 4.

Figure 11:
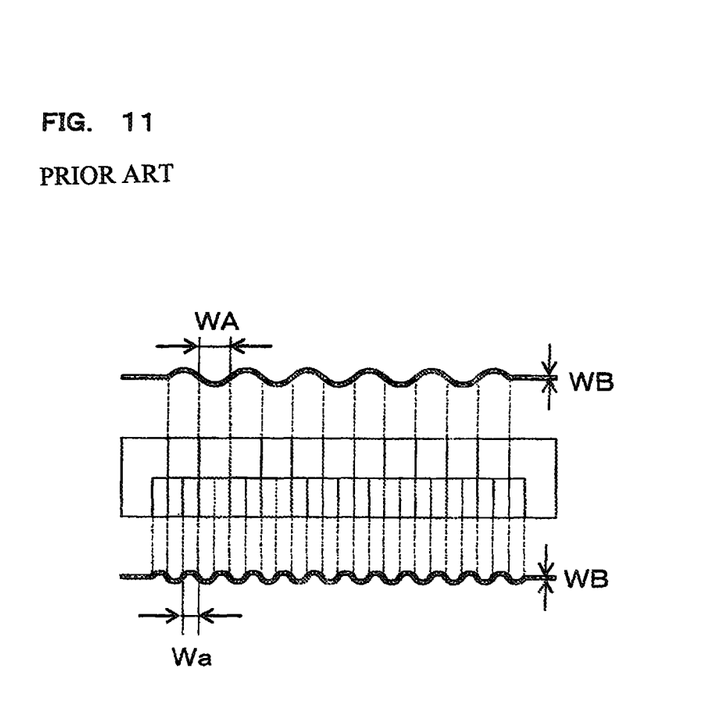
FIG. 11 is a front view showing a waveform sipe in Comparative example 2.

Further, in the tread pattern shown in FIG. 1, a tire having a straight slit-shaped sipe was Comparative example 1, and a tire having a waveform sipe as shown in FIG. 11 was Comparative examples 2 to 4, and the tires were evaluated.

The number of sipes in the tires produced in Examples 1 to 4 and Comparative examples 1 to 3 was four for each block. The number of sipes in the tire produced in Comparative example 4 was six for each block. A width WB of all the sipes formed in Examples 1 to 4 was 0.6 mm, and a protruding length from a base end to a top of a first protrusion 7 and a second protrusion 9 was all 0.3 mm.

Figure 9:
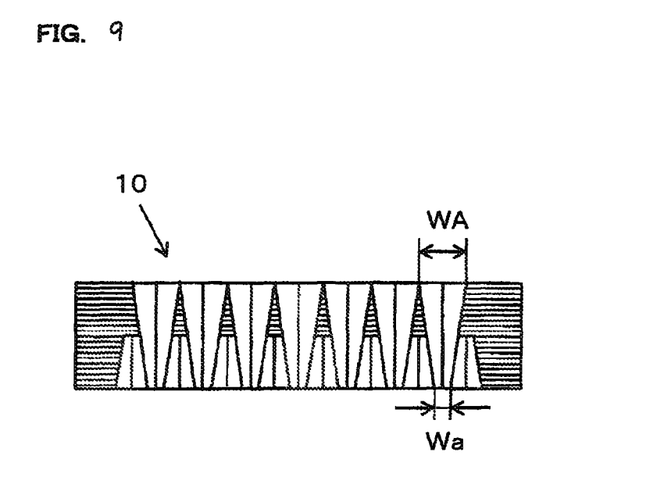
FIG. 9 is a front view showing a sipe blade for forming sipes in Examples 1, 2 and 4.
Figure 10:
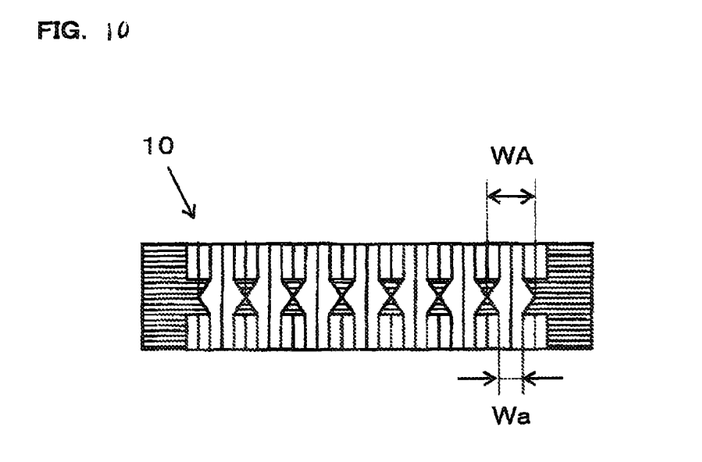
FIG. 10 is a front view showing a sipe blade for forming a sipe in Example 3.

FIG. 9 shows a sipe blade for forming the sipes in Examples 1, 2 and 4, and FIG. 10 shows a sipe blade for forming the sipe in Example 3. As shown, a maximum width of a first protrusion is WA, a minimum width thereof is Wa, and WA and Wa in Examples 1 to 4 are shown in Table 1.
[Evaluation Test]

Each of the abovementioned tires (195/65R15) was mounted to a car (4WD of 1500 cc domestically produced), and performance was evaluated. The contents thereof will be described below.
(1) Ice Performance (Braking Performance)

The test vehicle was traveled on an icy road, and a braking distance when a braking force was applied at a speed of 40 km/h to operate an ABS was evaluated with an index. The evaluation is indicated using an index with an index of Comparative example 1 being 100, and larger numerical values indicate higher ice braking performance. Ice braking performance was evaluated twice when the tires were new and when the tires wore (after the tires wore to a sipe depth of 50%). Only in Example 4, evaluation at the time of tire wearing was performed after the tire wore to a sipe depth of 30%.
(2) Vulcanizing Oven Releasability A sipe surface crack in the tire released from the oven in vulcanization was checked. Four or more sipe surface cracks in a circumference of the tire were counted as the number of defects, which was shown by indexes. Larger numerical values indicate fewer defects. The vulcanizing oven releasability was checked for 100 tires.
[Evaluation Results]

Table 1 shows evaluation results. Table 1 revealed that, among Comparative examples 2 to 4 with the waveform sipe, Comparative example 4 with the larger number of sipes for each block exhibited higher ice performance than Comparative example 1 with the straight sipe. On the other hand, vulcanizing oven releasability in Comparative example 4 was evaluated to be lower than that in Comparative example 1. This may be because rigidity of a block piece was reduced, and a surface area of a sipe blade was increased to easily bring the block piece into tight contact with the sipe blade.

Meanwhile, in Examples 1 to 4, ice performance was in an equal level to that in Comparative example 4. Further, vulcanizing oven releasability was evaluated to be equal to that in Comparative example 1 with the straight sipe. The high ice performance may be because the first protrusion and the second protrusion were formed to exhibit an edge effect and a water removing effect with a good balance in Examples 1 to 4.

The high vulcanizing oven releasability was able to be maintained because the sipe blade used in Examples 1 to 4 had a flat shape with irregularities formed only in one surface like the sipe blade used in Comparative example 1. Specifically, it may be because a surface area of the blade was smaller than that of the sipe blade for forming the waveform sipe, and further the number of sipes for each block was smaller than that in Comparative example 4, and thus a reduction in rigidity of the block piece was able to be avoided to allow smooth release from the vulcanization oven For each Example, in Example 1 with a second protrusion formed on a sipe bottom side, an edge effect of the second protrusion provides higher ice performance when the tire wore than when the tire was new. On the other hand, in Example 2 with a second protrusion formed on a tread surface side, higher ice performance was provided when the tire was new than when the tire wore.

In Example 3 with second protrusions formed on a tread surface side and a sipe bottom side, high ice performance was confirmed both when the tire was new and when the tire wore. In Example 4, the forming position of the second protrusion was changed according to the position of the sipe in the block to exhibit an edge effect and a water removing effect with a good balance and provide high ice performance.

TABLE 1

|  |  | Comparative Example 1 | Comparative Example 2 | Comparative Example 3 | Comparative Example 4 | Example 1 | Example 2 | Example 3 | Example 4 |
|---|---|---|---|---|---|---|---|---|---|
| Number of sipe/block | Number | 4 | 4 | 4 | 6 | 4 | 4 | 4 | 4 |
| Sipe width(thickness): WB | mm | 0.6 | 0.6 | 0.3 | 0.3 | 0.6 | 0.6 | 0.6 | 0.6 |
| First | Exist or Non-exist | Non-exist | waveform | waveform | waveform | exist | exist | exist | exist |
| Protrusion | WA mm | — | 2 | 2 | 2 | 3 | 3 | 3 | 3 |
|  | Wa mm | — | 1 | 1 | 1 | 1 | 1 | 1.5 | 1 |
| Ice Performance | Braking Performance new tire | 100 | 101 | 100 | 103 | 102 | 104 | 104 | 105 |
|  | worn tire | 100 | 103 | 99 | 103 | 104 | 102 | 104 | 105 |
| Vulcanizing oven releasability |  | 100 | 99 | 97 | 96 | 100 | 100 | 100 | 100 |
| Remarks |  | linear sipes with 0.6 mm width | waveform sipes with 0.6 mm width | waveform sipes with 0.3 mm width | larger number of waveform sipes with 0.3 mm width | second protrusions formed on a sipe bottom side | second protrusions formed on a tread surface side | second protrusions formed on a tread surface side and a sipe bottom side | two kinds of sipes in one block |

What is claimed is:

1. A pneumatic tire comprising:
a plurality of land portions partitioned by grooves and formed in a tread surface; and
a plurality of sipes formed in each of the land portions,
wherein a plurality of first protrusions are formed on only one of sipe inner wall surfaces opposed to each other in all the sipes, each of the first protrusions continuing in a tire depth direction from the tread surface to a sipe bottom and protruding toward an opposite sipe inner wall surface, the first protrusions are tapered toward the opposite sipe inner wall surface and are provided with a narrow portion so that a protrusion width of the first protrusions is formed to be narrow, the narrow portion is provided between the tread surface and the sipe bottom, and second protrusions protruding toward the opposite sipe inner wall surface are formed between narrow portions of adjacent first protrusions, and
wherein the sipe inner wall surface on which the first protrusions and the second protrusions are formed in the sipe is a surface closer to the center of the land portion in a tire circumferential direction among the sipe inner wall surfaces opposed to each other.

2. The pneumatic tire according to claim 1, wherein the first protrusions are formed so that the protrusion width of the first protrusions is gradually narrower from the tread surface side toward the sipe bottom side, the sipe bottom side of the first protrusions is the narrow portion, and the second protrusions are formed on the sipe bottom side.

3. The pneumatic tire according to claim 1, wherein the first protrusions are formed so that the protrusion width of the first protrusions is gradually narrower from the sipe bottom side toward the tread surface side, the tread surface side of the first protrusions is the narrow portion, and the second protrusions are formed on the tread surface side.

4. The pneumatic tire according to claim 1, wherein in a sipe at an edge of the land portion among sipes provided in the land portion, the first protrusions are formed so that the protrusion width of the first protrusions is gradually narrower from the sipe bottom side toward the tread surface side, the tread surface side of the first protrusions is the narrow portion, and the second protrusions are formed on the tread surface side, and in a sipe at a center of the land portion, the first protrusion is protrusions are formed so that the protrusion width of the first protrusions is gradually narrower from the tread surface side toward the sipe bottom side, the sipe bottom side of the first protrusions is the narrow portion, and the second protrusion is protrusions are formed on the sipe bottom side.

5. A pneumatic tire comprising:
a plurality of land portions partitioned by grooves and formed in a tread surface; and a plurality of sipes formed in each of the land portions,
wherein a plurality of first protrusions are formed on only one of sipe inner wall surfaces opposed to each other in all the sipes, each of the first protrusions continuing in a tire depth direction from the tread surface to a sipe bottom and protruding toward an opposite sipe inner wall surface, the first protrusions are tapered toward the opposite sipe inner wall surface and are provided with a narrow portion so that a protrusion width of the first protrusions is formed to be narrow, second protrusions protruding toward the opposite sipe inner wall surface are formed between narrow portions of adjacent first protrusions, and
wherein in a sipe at an edge of the land portion among sipes provided in the land portion, the first protrusions are formed so that the protrusion width of the first protrusions is gradually narrower from the sipe bottom side toward the tread surface side, the tread surface side of the first protrusions is the narrow portion, and the second protrusions are formed on the tread surface side, and in a sipe at a center of the land portion, the first protrusions are formed so that the protrusion width of the first protrusions is gradually narrower from the tread surface side toward the sipe bottom side, the sipe bottom side of the first protrusions is the narrow portion, and the second protrusions are formed on the sipe bottom side.

\* \* \* \* \*

UNITED STATES PATENT AND TRADEMARK OFFICE
CERTIFICATE OF CORRECTION

PATENT NO. : 8,439,094 B2
APPLICATION NO. : 12/831645
DATED : May 14, 2013
INVENTOR(S) : Yoshinori Asayama et al.

It is certified that error appears in the above-identified patent and that said Letters Patent is hereby corrected as shown below:

In the Claims

Column 10, Line 24, Claim 4, before "protrusions are" delete "protrusion is";

Column 10, Line 28, Claim 4, before "protrusions are" delete "protrusion is".

Signed and Sealed this
Seventeenth Day of September, 2013

Teresa Stanek Rea
*Deputy Director of the United States Patent and Trademark Office*